United States Patent [19]

Heiler

[11] Patent Number: 4,644,448
[45] Date of Patent: Feb. 17, 1987

[54] HEADLIGHT

[75] Inventor: Roland Heiler, Leonberg, Fed. Rep. of Germany

[73] Assignee: Dr. Ing. H.c.F. Porsche Aktiengesellschaft, Fed. Rep. of Germany

[21] Appl. No.: 836,484

[22] Filed: Mar. 5, 1986

[30] Foreign Application Priority Data

Mar. 6, 1985 [DE] Fed. Rep. of Germany ....... 3507928

[51] Int. Cl.⁴ .......................... B60Q 1/06; F21V 3/18
[52] U.S. Cl. ........................................ 362/66; 362/61; 362/62; 362/63; 362/64; 362/80; 362/311
[58] Field of Search .................. 362/61, 62, 63, 64, 362/276, 279, 325, 375, 35, 80, 83, 311, 361, 368, 375, 335, 66

[56] References Cited

U.S. PATENT DOCUMENTS

| | | | |
|---|---|---|---|
| 1,603,410 | 10/1926 | Ridlington | 362/66 |
| 1,685,690 | 9/1928 | Witzal | 362/66 |
| 2,390,634 | 12/1945 | Anfiero | 362/63 |
| 2,859,331 | 11/1958 | Grimes | 362/63 |
| 3,592,430 | 7/1971 | Coombs | 362/80 |
| 4,196,459 | 4/1980 | Dick | 362/311 |
| 4,234,908 | 11/1980 | McGee | 362/66 |
| 4,353,110 | 10/1982 | Ellis | 362/66 |
| 4,432,040 | 2/1984 | Matsuura et al. | 362/83 |
| 4,473,866 | 9/1984 | Davis | 362/61 |

Primary Examiner—Raymond A. Nelli
Attorney, Agent, or Firm—Barnes & Thornburg

[57] ABSTRACT

A headlight for motor vehicles which together with its optically effective parts such as light source, reflector and possibly a diffusion lens is retained within a housing. This housing is closed off by a diffusion lens or by a cover glass and is pivotal about an axis extending essentially in the longitudinal direction of the vehicle into an extended use position and into a retracted nonuse position. This axis is positioned at an acute angle with respect to the diffusion lens, and the headlight, respectively, the housing is rotated in the vehicle transverse direction about this so-positioned axis into two end positions (use position and nonuse position) by means of a tumbling movement.

23 Claims, 7 Drawing Figures

HEADLIGHT

The present invention relates to a headlight for vehicles, especially for motor vehicles, in which the headlight with its optically effective parts such as light source, reflector, and possibly a diffusion lens are retained within a housing and this housing is closed off by a diffusion lens or cover glass and is pivotal about an axis extending essentially in the vehicle longitudinal direction into an extended use position and into a retracted non-use position.

Headlights for motor vehicles are disclosed in the DE-AS 19 25 317 which can be rotated in the transverse direction about an axis extending concentric to the diffusion lens into a use and into a non-use position. A linkage connected with the two rotating shaft of the headlights is used as actuating element, by way of which a synchronous movement of the two headlights takes place. In the non-use position, the headlight is recessed in the body and the undersurface of the housing closes the body opening flush, for which purpose this housing is additionally constructed in a special manner as flap. With this construction, the axis of rotation is arranged extending concentrically to the diffusion lens so that it is movable only in a vertical plane and therefore requires a relatively large structural space inside of the vehicle body for the complete recessing. Furthermore, a housing for closing the opening in the body is necessary in a complicated and costly manner which is provided in a particular way with a painted closure cap, whereby in the use position the housing also demands a relatively large space in the vehicle body.

It is the object of the present invention to provide a headlight for motor vehicles, especially for sports cars, which is rotatable in a simple structural realization about an axis of rotation into an uprighted used position and into a recessed non-use position that extends flush with the body surface.

The underlying problems are solved according to the present invention in that the axis of rotation of the shaft is inclined at an acute angle with respect to the diffusion lens, and the headlight, respectively, the housing is rotatable in the vehicle transverse direction into the two end positions (use position and non-use position) about the thus-inclined axis by means of a tumbling movement.

The principal advantages achieved with the present invention reside in that by a particular positioning of the single rotary axis with respect to the diffusion lens of the headlight such a movement of the housing, respectively, of the headlight is adhieved that in the non-use position the diffusion lens serves simultaneously as flush closure cap for the opening in the body, whereby the diffusion lens itself is itself arranged visible from the outside. As a result of this visible arrangement, the possibility exists for a simple provision of a further auxiliary headlight usable as light source. The auxiliary headlight is arranged either integrated into the housing or fixedly behind the housing.

By a rotary drive of the housing by way of an E-motor (electric motor), a movement linkage of known type, which is very space-demanding and consists of several movable parts, will not be required.

The motor supported on the body side includes at the same time the sole bearing location for the shaft so that space-requiring additional bearing places can be dispensed with.

The rotating motor is preferably constructed as E-motor whereby one motor each is provided for each headlight. The motors are connected with each other and controlled in such a manner by way of a control circuit of any known type that only a synchronous movement of both headlights is possible. In their end portions, the headlights rest, for example, at an abutment which is provided with a retaining device in order that a constant position is assured also in case of vibrations.

The special course of movement of the headlight, respectively, of the housing, in the manner of a tumbling movement offers the possibility, especially only by a particular positioning of the rectilinearly extending one-piece rotating shaft, to achieve, according to the present invention, the optimum positions with each desired shape configuration of the hood.

Additionally, it has been found that the tumbling movement of the headlight favors that an ice layer which has formed over the headlights can be broken up easily during the rotation owing to the diffusion lens which is being displaced during such tumbling movement.

These and other objects, features and advantages of the present invention will become more apparent from the following description when taken in connection with the accompanying drawing which shows, for purposes of illustration only, two embodiments in accordance with the present invention, and wherein.

Figure 1:
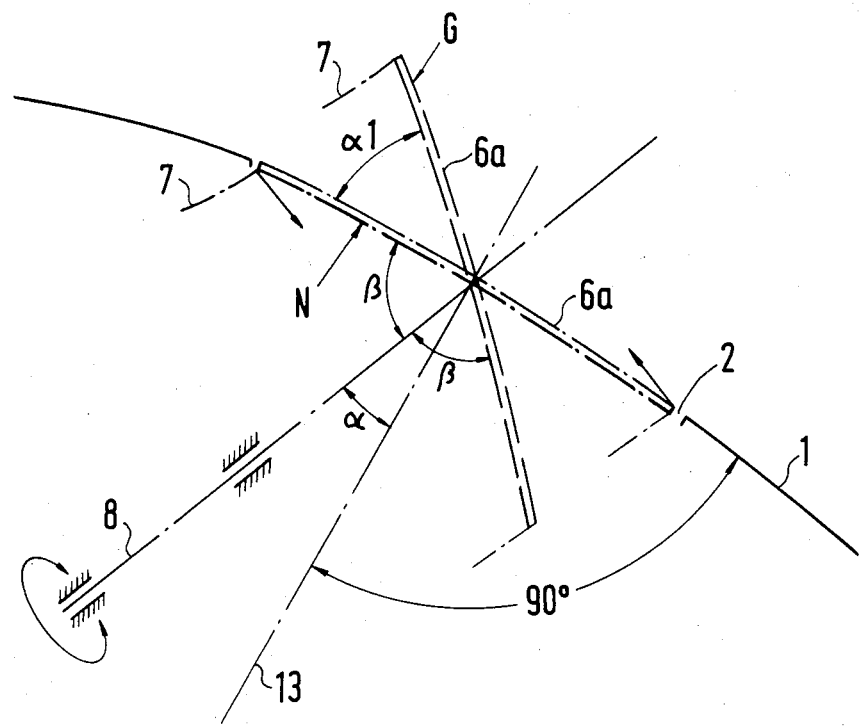
FIG. 1 is a schematic view of the position of the axes of rotation to the diffusion lens in the use and in the non-use position in a headlight according to the present invention.

Referring now to the drawing wherein like reference numerals are used throughout the various views to designate like parts, openings 2 for front headlights generally designated by reference numeral 3 are provided in a motor vehicle 1 at the front end of the body thereof. These headlights 3 are arranged together with their optionally effective parts such as light source 4, reflector 5, and possibly a diffusion lens 6 in a housing 7 which is closed off by a diffusion lens 6a or a cover glass. The reflector 5 can be closed off by a diffusion lens so that the housing 7 is then only closed off by a cover glass. If the reflector does not include a diffusion lens, the housing 7 is then covered off by a diffusion lens. The housing 7, respectively, the headlight 3 is rotatable about an axis 8 into an extended use position G and into a retracted non-use position N. The axis 8 extends approximately in a vertical vehicle longitudinal plane X—X (FIG. 6) and pivots in the transverse direction to the vehicle as illustrated more fully by the arrows in FIGS. 5 and 6. The pivot angle from one position into the other position amounts approximately to 180° so that, for example, at 0° the end position of the non-use position N is adjusted and after a rotation through 180° about the axis 8, the end position of the use position G is adjusted.

In the use position G, the housing 7 is uprighted in such a manner that the light source 4 is effective. In contrast thereto, the housing 7 is so retracted into the body in the non-use position N that the diffusion lens 6a extends flush with the body surface of the vehicle 1.

The axis 8 is inclined at an acute angle $\beta$ to the diffusion lens 6a (FIG. 1). The headlight 3, respectively, the diffusion lens 6a carries out, as shown in FIG. 1, a so-called tumbling movement, for example, from the position N into the position G, which effects a retracting and extending of the headlight.

In particular, the axis of rotation 8 is arranged in a vertical longitudinal center plane X—X inclined at an angle $\alpha$ to an ideal axis 13 extending at right angle to the diffusion lens 6a (FIG. 1). This angle $\alpha$ is bisecting angle of the angle $\alpha_1$ between the diffusion lens 6a in the use position G and the non-use position N. The diffusion lens 6a as well as the opening 2 are constructed axially symmetrically whereby the axis of rotation 8 inclined at an angle $\beta$ extends concentrically through the diffusion lens 6a.

Figure 2:
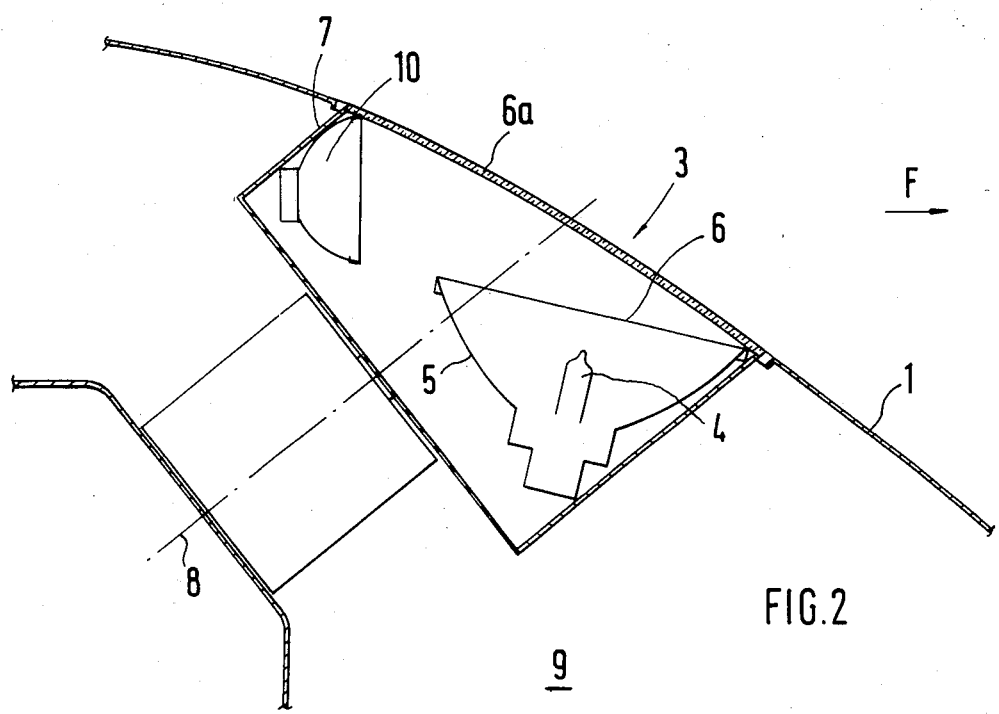
FIG. 2 is a somewhat schematic cross-sectional view through the headlight with a further auxiliary headlight used as light horn in the housing according to the present invention in the retracted position.
Figure 3:
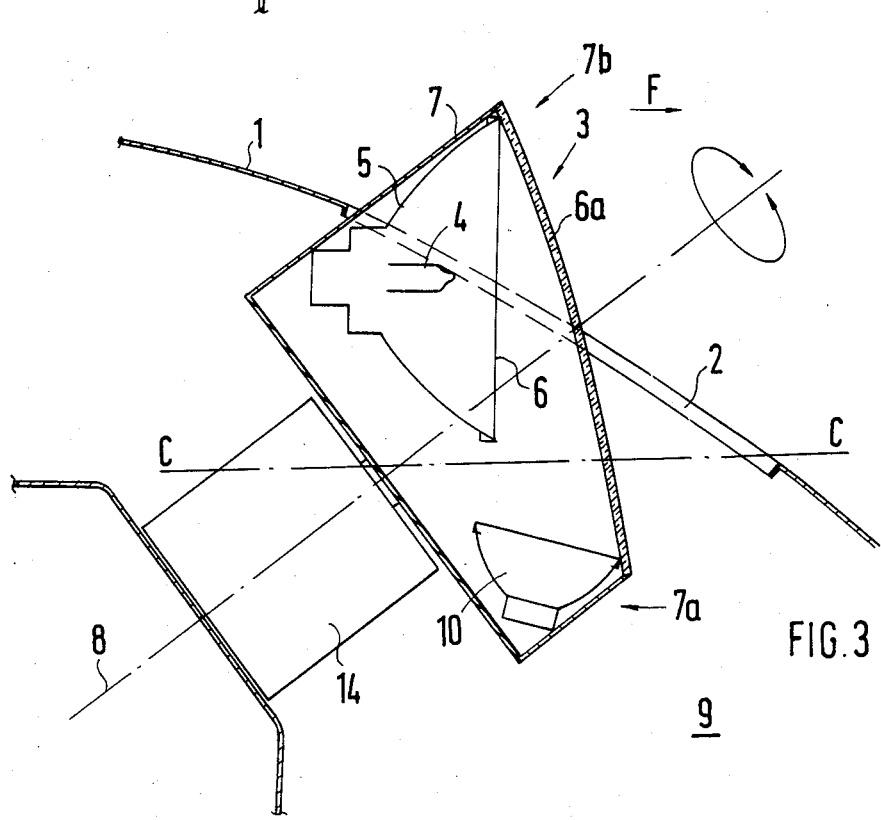
FIG. 3 is a cross-sectional view, similar to FIG. 2, showing the headlight in the extended use position.
Figure 4:
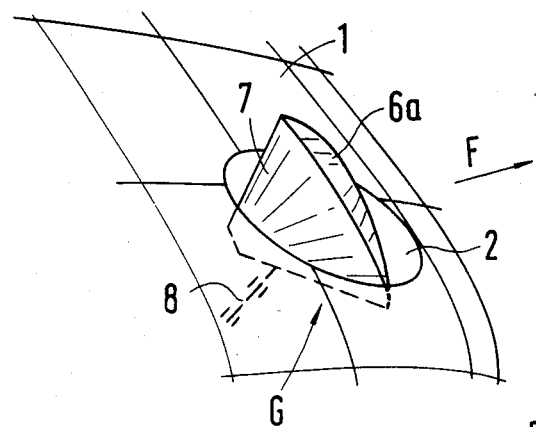
FIG. 4 is a partial schematic perspective view illustrating the use position of the headlight in accordance with the present invention.
Figure 5:
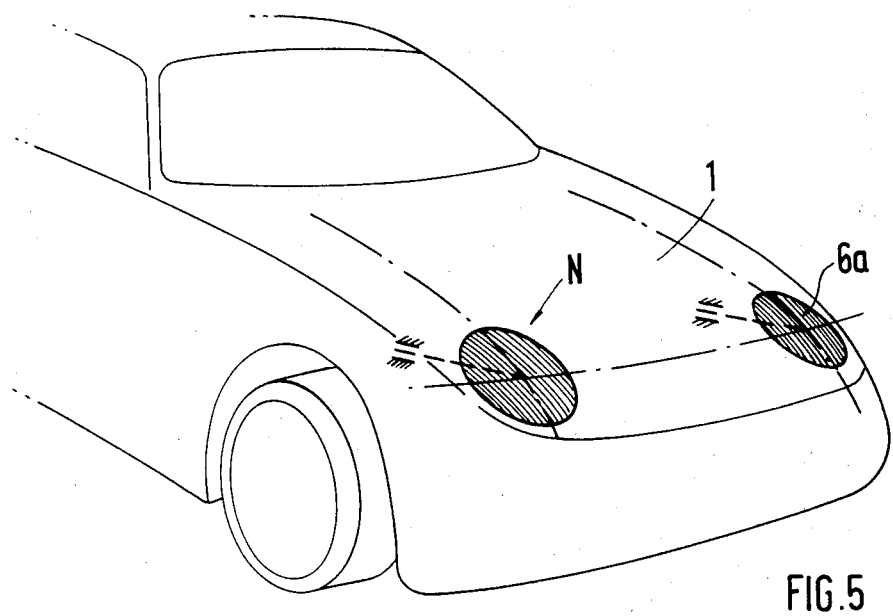
FIG. 5 is a somewhat schematic perspective view of the non-use position of the headlights of this invention in the motor vehicle with their associated axes of rotation.
Figure 6:
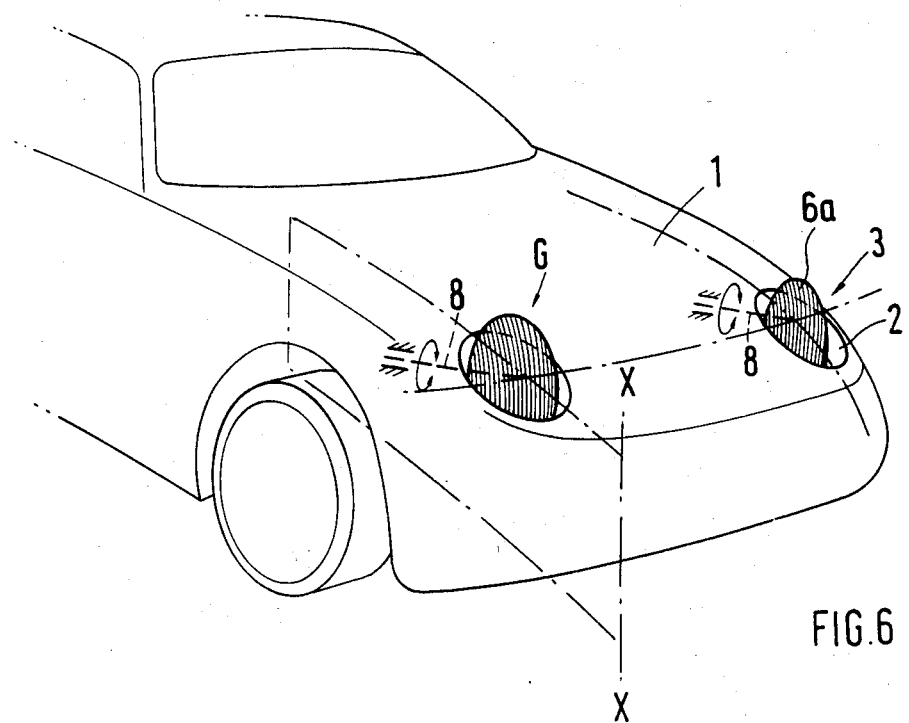
FIG. 6 is a perspective view, similar to FIG. 5, illustrating the use position of the headlights in the motor vehicle with their associated axes of rotation.

In the illustrated embodiment according to FIGS. 2 and 3 as well as the further FIGS. 5 and 6, the uprighted highlight 3 is in the position G with its lower housing part 7a inside of the interior space 9 covered by the hood. The light source 4, however, is so arranged that the reflector 5 with its lower boundary lies slightly above a horizontal plane C—C whose position is dependent on the lower boundary of the opening 2.

The housing 7 of the headlight 3 is so constructed that in addition to the main headlight 4, 5, an auxiliary headlight 10 is arranged within the same. This auxiliary headlight 10 is, as shown more fully in FIGS. 2 and 3, provided in such a manner that in the non-use position N, when the diffusion lens 6a extends flush with the body surface, it assumes a working position for giving off light signals as a so-called light horn.

Figure 7:
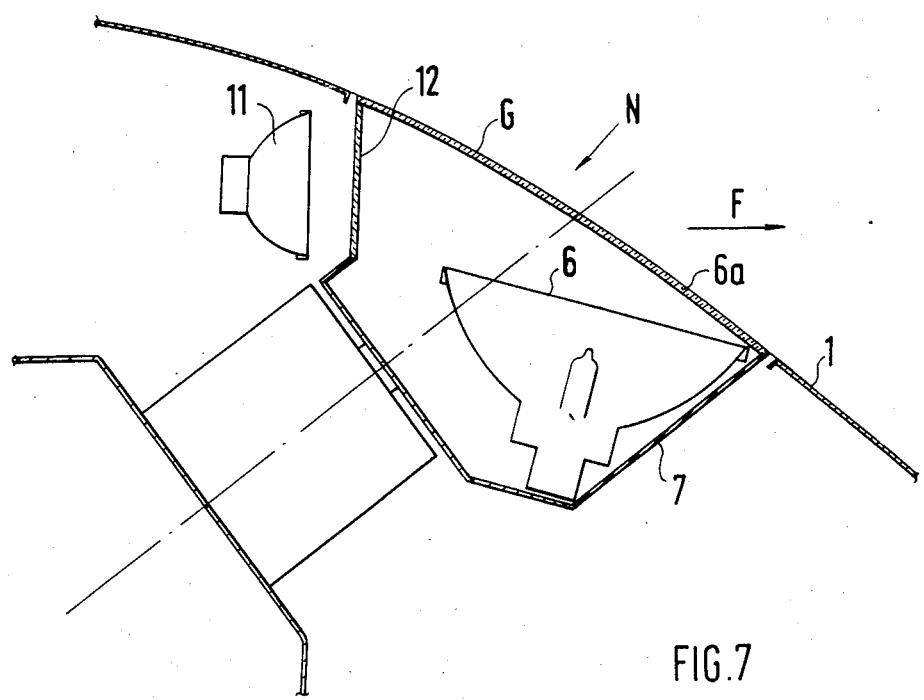
FIG. 7 is a cross-sectional view, similar to FIG. 2, through a modified embodiment of a headlight in accordance with the present invention.

According to a further embodiment according to FIG. 7, the auxiliary headlight 11 is arranged fixedly in the body structure. For the passage of light signals, the housing 7 is provided with a corresponding opening which is covered off by a transparent windowpane 12.

The rotary drive of the housing 7 takes place preferably by way of an electric motor 14 which is supported at the body structure. The shaft 8 is rotatably supported at least once inside of the motor 8 whereby a means transmitting a rotary movement is provided for the rotation between the shaft 8 and the housing 7. This means may be, for example, a belt drive, a gear drive, or a similar element. For the exact adjustment of the two end positions G and N of the headlight, abutments may serve which are equipped with retaining devices in order that the headlight 3 retains its position during vibrations and shocks.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A headlight for vehicles, comprising housing means in which the headlight together with its optically effective parts is retained, transparent cover means for closing off said housing means, and means for rotating said housing means about an axis extending essentially in the longitudinal direction of the vehicle into an extended use position and into a nonuse position, the rotating axis being inclined with respect to the transparent cover means at an acute angle, and at least one of headlight and housing means being rotatable in the vehicle transverse direction about the thus-positioned axis into the two end positions of the headlight by means of a rotary movement.

2. A headlight according to claim 1, wherein the optically effective parts include a light source and reflector.

3. A headlight according to claim 2, wherein the optically effective parts further include a diffusion lens and wherein said transparent cover means is a cover glass.

4. A headlight according to claim 2, wherein said transparent cover means is a diffusion lens.

5. A headlight according to claim 1, wherein one of housing means and headlight is rotatable through an angle of at least 180° and assumes its respective end position at an angle of rotation of about 0° and of about 180°.

6. A headlight according to claim 1, wherein the pivot axis is inclined within a vertical longitudinal plane at an angle with respect to an ideal axis extending perpendicularly to the transparent cover means, and said angle corresponds substantially to the bisector of the angle between the transparent cover means in the use position and the said nonuse position of the headlight.

7. A headlight according to claim 1, wherein the transparent cover means as well as the opening in the body are constructed axially symmetrically with respect to the pivot axis.

8. A headlight according to claim 1, wherein the transparent cover means is visible in the one end position and extends flush with the body surface and is erected in the other end position of the headlight rotated through about 180°.

9. A headlight according to claim 8, wherein one of erected headlight and housing means is located with its lower part inside of the body and protrudes with its upper part freely beyond the body contour.

10. A headlight according to claim 8, wherein the reflector together with the light source is arranged in the upper part of the erected housing means and wherein the lowest point of the reflector is located approximately in a common horizontal plane with the lowest point of the opening in the body.

11. A headlight according to claim 1, wherein, in addition to the main headlight, an auxiliary headlight which is integrated into the housing means, is arranged producing light signals in said nonuse position of the headlight.

12. A headlight according to claim 1, wherein the housing means is provided in its rear wall with an opening covered off by a transparent cover means, behind which is retained a fixed auxiliary headlight that is arranged producing light signals in the retracted nonuse position.

13. A headlight according to claim 1, further comprising a rotating motor operatively connected with a rotary shaft, the rotary motor being arranged directly behind the housing means and being supported on the body side, and said motor including at the same time a single bearing support means for the housing means.

14. A headlight according to claim 13, wherein means producing a rotary movement are provided between the rotary shaft and the housing means for rotating the housing means into its two end positions.

15. A headlight according to claim 14, wherein said last-mentioned means includes a gear transmission or a belt drive.

16. A headlight according to claim 6, wherein the transparent cover means as well as the opening in the body are constructed axially symmetrically with respect to the pivot axis.

17. A headlight according to claim 16, wherein the transparent cover means is visible in the one end position and extends flush with the body surface and is erected in the other end position of the headlight rotated through about 180°.

18. A headlight according to claim 17, wherein one of erected headlight and housing means is located with its lower part inside of the body and protrudes with its upper part freely beyond the body contour.

19. A headlight according to claim 18, wherein the reflector together with the light source is arranged in the upper part of the erected housing means and wherein the lowest point of the reflector is located approximately in a common horizontal plane with the lowest point of the opening in the body.

20. A headlight according to claim 19, wherein, in addition to the main headlight, an auxiliary headlight which is integrated into the housing means, is arranged producing light signals in said nonuse position of the headlight.

21. A headlight according to claim 19, wherein the housing means is provided in its rear wall with an opening covered off by a transparent cover means, behind which is retained a fixed auxiliary headlight that is arranged producing light signals in said nonuse position.

22. A headlight according to claim 19, further comprising a rotating motor operatively connected with a rotary shaft, the rotary motor being arranged directly behind the housing means and being supported on the body side, and said motor including at the same time a single bearing support means for the housing means.

23. A headlight according to claim 13, wherein means producing a rotary movement are provided between the rotary shaft and the housing means for rotating the housing means into its two end positions.

* * * * *